Parker, Hall & Pierce,
Hay Fork.
No. 62,970.  Patented Mar. 19, 1867.
Attest, John Johnston
A. C. Johnston
James H. Parker,
James T. Hall,
Isaac Pierce.
By their Attorney James J. Johnston
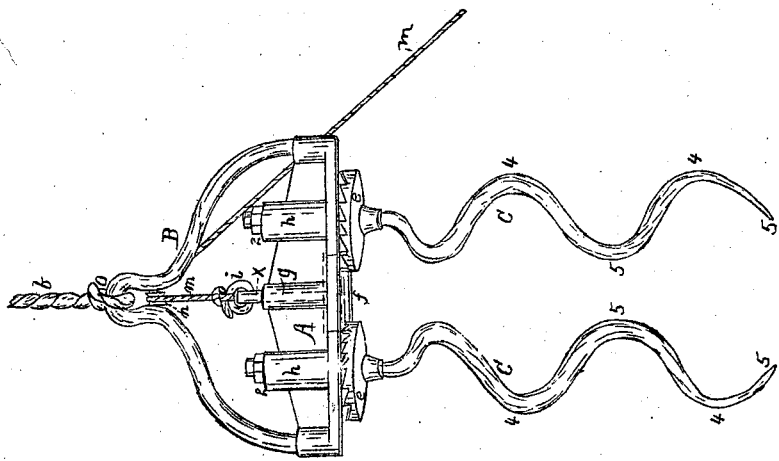

United States Patent Office.

JAMES H. PARKER, JAMES T. HALL, AND ISAAC PIERCE, OF TRENTON, NEW YORK.

Letters Patent No. 62,970, dated March 19, 1867.

IMPROVEMENT IN HORSE HAY-FORKS.

*The Schedule referred to in these Letters Patent and making part of the same.*

TO ALL WHOM IT MAY CONCERN:

Be it known that we, JAMES H. PARKER, JAMES T. HALL, and ISAAC PIERCE, all of Trenton, in the county of Oneida, and State of New York, have invented a new and useful Improvement in "Hay Elevators;" and we do hereby declare the following to be a full and exact description thereof, reference being had to the accompanying drawings, and to the letters of reference marked thereon.

Our invention consists in the combination and arrangement of a yoke, cross-head, pawl, ratchet-wheels, and spiral tines, constructed, arranged, combined, and operating in the manner hereinafter described.

To enable others skilled in the art to make and use our invention, we will proceed to describe its construction and operation.

In the accompanying drawings, which form part of this specification, A represents the cross-head, which is provided with bearings, $h$, for the axis of the tines C and a guide, $g$, for the shank $x$ of the pawl $f$, which moves in a recess made in the cross-head. To each end of the cross-head A are secured the ends of the yoke B, which is provided with a pulley, $n$, over which passes the cord or rope $m$, which is used for unshipping the pawl $f$. The cord or rope $m$ is secured to a ring, $i$, in the shank $x$ of the pawl $f$. The hoisting rope $l$ is attached to the yoke B at the point marked O. The tines C are in form spiral, and resemble an ordinary cork-screw, and are made tapering from the point up to the ratchet-wheels $e$, which are secured on the tines in a permanent manner. The tines are secured and held in their bearings $h$ by riveting washers or securing suitable collars on their upper end, as indicated at the point marked 2.

As the construction and arrangement of the several parts of our hay elevator, and the relation the said parts bear to each other, will readily be understood by reference to the accompanying drawings, we will without further description proceed to describe the operation of our improvement, which is as follows: All things being constructed and arranged as herein described, and as represented in the accompanying drawings, we press down on the yoke B, which will cause the tines C to enter the hay, the tines revolving and winding their way into the hay by the pressure upon them and by their spiral form. After they have entered the hay the desired distance power is applied to the rope $l$, and the elevator and its load are hoisted to the desired place. Now, by pulling on the cord or rope $n$ the pawl $f$ will become unshipped from the ratchet-wheels $e$, and the weight of the hay on the tines will impart to them a revolving motion, which will cause them to unwind and become released from the hay.

The important point in our invention consists in the use of two spiral tines, one having a right, and the other a left-hand twist, and arranged and combined with relation to each other so that they will bind and lock the hay between them when held in a fixed position, so that it cannot possibly slip or slide down on the tines until said tines are released and allowed to revolve. This will readily appear by reference to the accompanying drawings; for, be it observed, that the distance between the tines at part marked 4 is greater than that at part marked 5, hence the hay must become bound or locked in between these points, and can only be released by the revolving of the tines.

We are aware that a single tine has been used for elevating hay, and we are aware that two spiral tines, in combination with two straight tines, placed at right angles to a cross-head, have also been used for like purpose. We therefore do not claim broadly the spiral tines, but what we do claim, is—

1. Two spiral tines, one having a right-hand, the other a left-hand twist, and so arranged and held with relation to each other, when in the hay, that it will be bound and held from sliding and slipping off the tines until they are allowed to revolve at the will and pleasure of the operator.

2. The combination and arrangement of the yoke B, cross-head A, tines C, ratchet-wheels $e$, and pawl $f$, constructed arranged, and operating in the manner herein described, and for the purpose set forth.

JAMES H. PARKER,
JAMES T. HALL,
ISAAC PIERCE.

Witnesses:
A. J. BRIGGS,
J. W. OWEN.